(No Model.) 2 Sheets—Sheet 1.
J. P. SCHIMMEL.
WATER COOLER AND REFRIGERATOR.
No. 579,367. Patented Mar. 23, 1897.
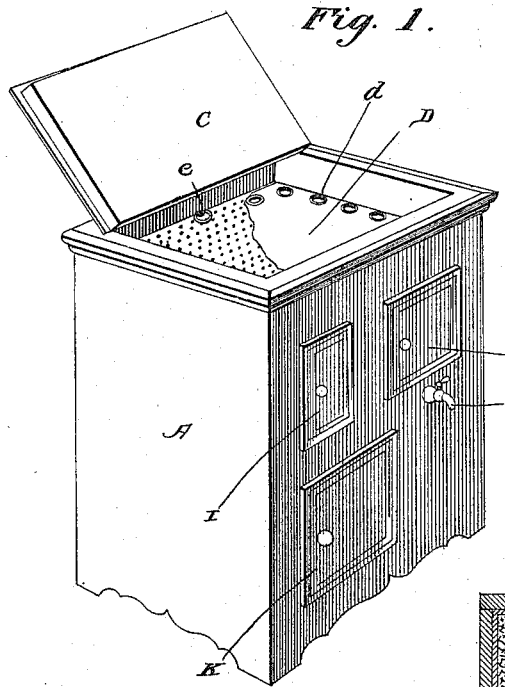
Fig. 1.
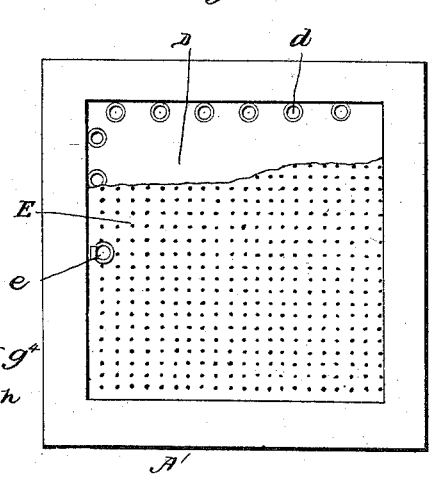
Fig. 2.
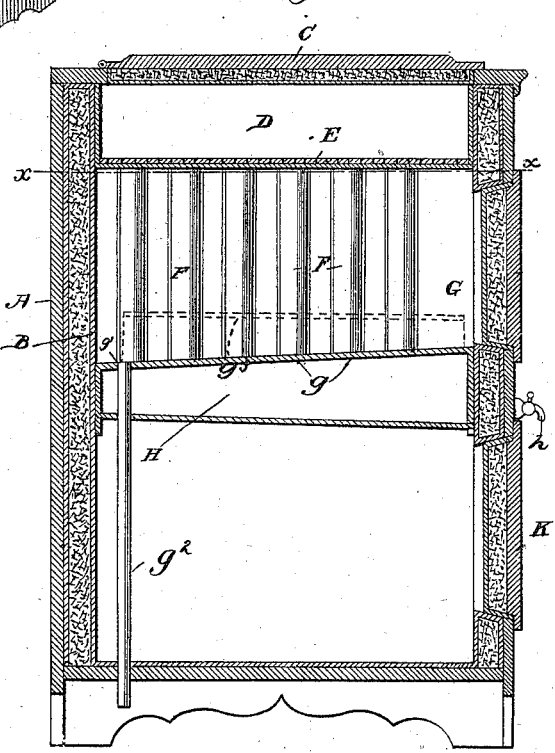
Fig. 3.
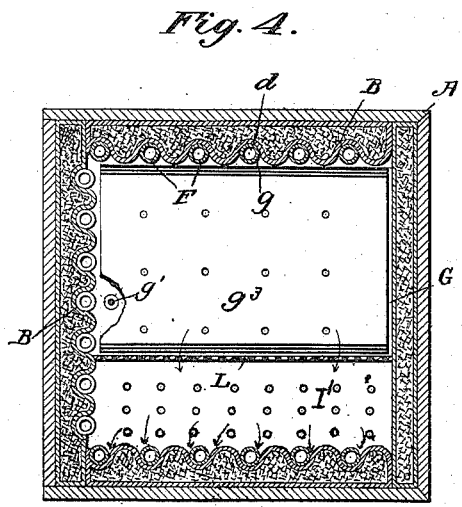
Fig. 4.
Fig. 7.
Attest.
Edw. S. Duvall Jr.
Milton O'Connell
Inventor:
John Peter Schimmel
per Fred S. Tasker,
Atty.

(No Model.) 2 Sheets—Sheet 2.

J. P. SCHIMMEL.
WATER COOLER AND REFRIGERATOR.

No. 579,367. Patented Mar. 23, 1897.

Witnesses.
Edw. D. Duvall Jr.
A. W. Bayard.

Inventor
John Peter Schimmel
per Fred'k E. Tasker,
Atty.

THE NORRIS PETERS CO., PHOTO-LITHO., WASHINGTON, D. C.

UNITED STATES PATENT OFFICE.

JOHN PETER SCHIMMEL, OF MADISONVILLE, KENTUCKY, ASSIGNOR OF ONE-HALF TO JOHN FREDERIC HEAFER, OF SAME PLACE.

WATER-COOLER AND REFRIGERATOR.

SPECIFICATION forming part of Letters Patent No. 579,367, dated March 23, 1897.

Application filed October 12, 1895. Serial No. 565,503. (No model.)

*To all whom it may concern:*

Be it known that I, JOHN PETER SCHIMMEL, a citizen of the United States, residing at Madisonville, in the county of Hopkins and State of Kentucky, have invented certain new and useful Improvements in Refrigerators and Water-Coolers; and I do hereby declare the following to be a full, clear, and exact description of the invention, such as will enable others skilled in the art to which it appertains to make and use the same.

My invention relates to improvements in attachments for refrigerators, ice-chests, water-coolers, and the like; and some of the objects of my invention are to provide means whereby the ice is made to serve the double purpose of cooling the different chambers of the refrigerator and also cooling water placed therein for drinking purposes, and also to secure a circulation of air through the different chambers or compartments of the refrigerator, whereby the odors or gases arising from the articles of food placed therein are forced out and pure air is maintained at all times. I attain these objects by the constructions, combinations, and arrangements of parts illustrated in the accompanying drawings, in which—

Figure 5:
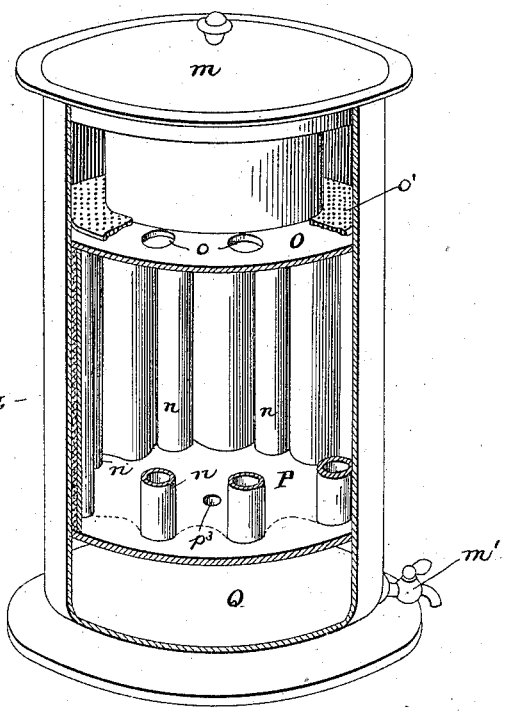
Figure 6:
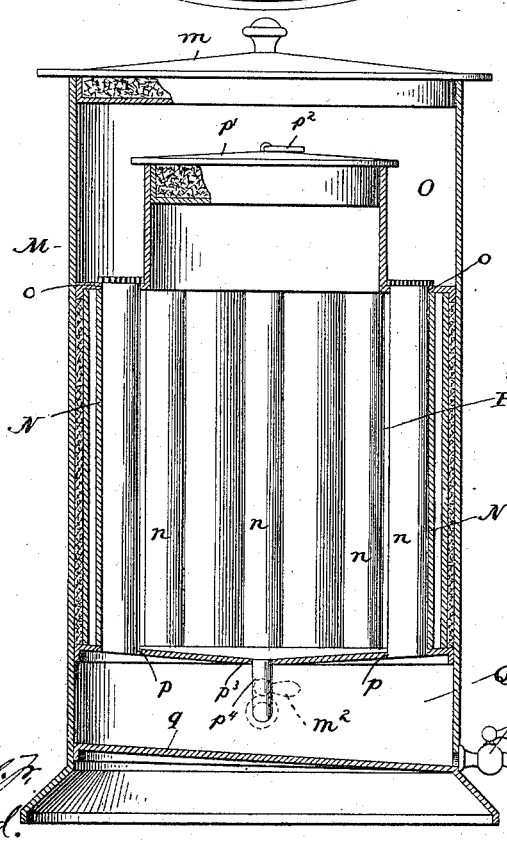

Figure 1 is a perspective of a refrigerator embodying my improvements, showing the ventilator and water-receiver. Fig. 2 is a top plan view, partly broken away, showing the water-receiver. Fig. 3 is a vertical transverse section showing the several chambers or compartments of the refrigerator. Fig. 4 is a horizontal section through the ice-chamber on line $x\,x$, Fig. 3. Fig. 5 is a perspective view of a modification of my former construction, showing an ice-cooler embodying my improvements. Fig. 6 is a sectional view of the same. Fig. 7 is an end view of the ice-rack.

Similar letters of reference designate like parts throughout the several views.

In the drawings the letter A represents the frame or body of the refrigerator.

B designates plates of zinc or like material which are filled with powdered charcoal or similar substance to preserve the ice. These plates surround the interior of the refrigerator and serve as a lining therefor, the said plates B being provided on one side with corrugations extending half-way around the pipes or tubes F to prevent the pipes or tubes from being injured by the ice.

C refers to the top or cover of the refrigerator, by means of which access is had to the water-receiver.

D denotes the water-receiver formed in the upper portion of the refrigerator, the bottom of which is supplied with holes or openings $d$, arranged along the sides thereof.

E has reference to a perforated strainer composed of tin or other suitable material, which is adapted to rest upon the bottom of the receiver D and prevent straw or other particles from getting into the pipes or tubes and thence into the water in the reservoir below. This strainer is provided with a ring $e$, by means of which it can be removed from the receiver when desired.

F represents a row of vertical pipes or tubes arranged along the sides of the ice-chamber G, the upper ends of which are secured around the openings $d$ in the bottom of the receiver D, and the lower ends of said tubes being attached to the bottom of the ice-chamber G around the holes $g$ therein.

G denotes the ice-chamber, into which the ice is introduced through the door $g^4$, and the bottom of this chamber slants or falls toward the back thereof, where is formed a hole or opening $g'$, around the under side of which is secured a drain or waste pipe $g^2$, through which the water accumulating in said chamber passes off.

$g^3$ designates a detachable ice-rack provided with holes or openings through which the water passes and constructed of one piece of sheet metal having the sides thereof turned downward, forming the supports upon which the rack rests.

H refers to the water-reservoir, into which the pipes F empty the water from the receiver D, and the bottom thereof slants or falls toward the front to permit all of the water therein to be drawn off through the spigot or cock $h$, located in the front wall of the reservoir.

I and K refer to the doors opening into the chambers or compartments intended for the reception of the articles desired to be kept cool, the upper compartment I' being separated from the ice-chamber G by a perforated ventilator L and having a perforated bottom, whereby pure cool air from the ice-chamber circulates into the various chambers or compartments of the refrigerator.

The water is poured into the receiver D and passes thence down through the pipe F into the reservoir H. Sufficient water is poured into the receiver D to cause the water to stand half-way up in the pipes F. The water is thus kept cool and can be drawn off for drinking purposes as desired by means of the spigot $h$.

Figs. 5 and 6 illustrate a modification of my former construction, in which the same improvements are applied to water-coolers. Referring to this modification, M designates a water-cooler having a cover $m$ and spigots $m'$ and $m^2$. N denotes a lining provided with corrugations adapted to receive and protect the tubes of pipes $n$, and the space between this lining and the casing of the cooler is filled with charcoal or similar substances, as usual. O denotes the water-receiver, the bottom of which is provided with holes $o$, opening into the upper ends of the vertical pipes $n$, and over these holes $o$ is a removable strainer $o'$ to prevent sawdust and the like from getting into the tubes $n$. P refers to the ice-chamber, the bottom of which is provided with holes $p$, corresponding to the holes $o$ in the water-receiver, and around these holes $p$ are secured the tubes or pipes $n$, which connect the said holes $o$ and $p$ and convey the water from the water-receiver O to the reservoir Q through the ice-chamber P. The ice-chamber P is also provided with a top or cover $p'$, having a ring $p^2$ in the top thereof, by means of which the cover can be removed when necessary, and the bottom of this chamber slopes toward the center, in which is a hole $p^3$, through which the waste water from the ice passes out through pipe $p^4$ and is drawn off. Q indicates the water-reservoir, the bottom $q$ of which slants or falls toward the spigot $m'$, by means of which the drinking-water can be drawn off from the reservoir.

I do not confine myself to the peculiar construction and arrangement of parts herein described and set forth, but I may vary the same without departing from the invention. This construction is adapted to be applied to water-coolers, and the arrangement of parts is substantially the same as herein set forth and described.

Having thus described my invention, what I claim as new, and desire to secure by Letters Patent, is—

In a refrigerating device, the combination with a water-receiver, of a cooling-chamber thereunder, a reservoir to receive the cooled water, pipes or tubes located around the cooling-chamber and connecting the receiving-chamber with the reservoir, and metallic plates surrounding the cooling-chamber and partly embracing the pipes to protect the same.

In testimony whereof I affix my signature in presence of two witnesses.

JOHN PETER SCHIMMEL.

Witnesses:
B. F. PRITCHETT,
S. H. HARMER.